(12) United States Patent
Accapadi et al.

(10) Patent No.: US 8,370,854 B2
(45) Date of Patent: Feb. 5, 2013

(54) AUTOMATIC CLOSURE OF A FILE OR A DEVICE IN A DATA PROCESSING SYSTEM

(75) Inventors: Jos M. Accapadi, Austin, TX (US); Brian W. Hart, Austin, TX (US); Anil Kalavakolanu, Austin, TX (US); Steven F. Lang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 659 days.

(21) Appl. No.: 12/540,672

(22) Filed: Aug. 13, 2009

(65) Prior Publication Data

US 2011/0041143 A1 Feb. 17, 2011

(51) Int. Cl.
*G06F 3/00* (2006.01)
*G06F 9/44* (2006.01)
*G06F 9/46* (2006.01)
*G06F 13/00* (2006.01)
*G06F 12/00* (2006.01)
*G06F 17/30* (2006.01)

(52) U.S. Cl. ........ 719/318; 719/317; 719/321; 719/328; 707/813; 707/814

(58) Field of Classification Search .................. None
See application file for complete search history.

(56) References Cited

U.S. PATENT DOCUMENTS

| 5,530,905 | A | * | 6/1996 | Nichols et al. ................ 709/227 |
| 5,774,292 | A | * | 6/1998 | Georgiou et al. .......... 360/73.03 |
| 5,963,726 | A | | 10/1999 | Rust et al. |
| 6,047,124 | A | | 4/2000 | Marsland |
| 6,081,807 | A | | 6/2000 | Story et al. |
| 6,085,243 | A | | 7/2000 | Fletcher et al. |
| 6,128,745 | A | * | 10/2000 | Anderson et al. ............. 713/323 |
| 6,912,578 | B1 | | 6/2005 | Hanko et al. |
| 7,577,769 | B2 | * | 8/2009 | Cobb et al. ....................... 710/18 |
| 2005/0278278 | A1 | * | 12/2005 | Petev et al. ....................... 707/1 |
| 2006/0200594 | A1 | * | 9/2006 | Cobb et al. ....................... 710/18 |

OTHER PUBLICATIONS

"How Autofs Works", System Administration Guide, vol. 3, Sun Microsystems, Inc., 2000, http://docs.sun.com/app/docs/doc/806-0916/6ja8539g7?a=view, 11 pages.
Callaghan, Brent et al., "The Automounter", Proceedings of the Winter 1989 USENIX, http://citeseerx.ist.psu.edu/viewdoc/summary?doi=10.1.1.31.2978, 9 pages.
Labiaga, Ricardo, "Enhancements to the Autofs Automounter", Proceedings of LISA '99: 13th Systems Administration Conference, Nov. 7-12, 1999, http://www.usenix.org/event/lisa99/full_papers/labiaga/labiaga.pdf, pp. 165-174.

* cited by examiner

*Primary Examiner* — Emerson Puente
*Assistant Examiner* — Jonathan R Labud
(74) *Attorney, Agent, or Firm* — Francis Lammes; Stephen J. Walder, Jr.; Jeffrey S. LaBaw

(57) ABSTRACT

A mechanism is provided for automatically closing a file or a device. A service routine monitor monitors a request received from either an application that opened the file or a device driver that readied the device. The service routine monitor determines whether the file or the device has been accessed within a predetermined time interval. Responsive to the file or the device failing to be accessed within the predetermined time interval, the service routine monitor sends a call to the application that opened the file or the application or a higher level device driver that requested that the device driver ready the device. Responsive to a response from the application or the higher level device driver indicating that the use of the file or the device is no longer needed, the service routine monitor closes the file or quiesces the device.

20 Claims, 3 Drawing Sheets

AUTOMATIC CLOSURE OF A FILE OR A DEVICE IN A DATA PROCESSING SYSTEM

BACKGROUND

The present application relates generally to an improved data processing apparatus and method and more specifically to an apparatus and method for automatically closing a file or a device in a data processing system.

A device driver is a computer program allowing higher-level computer programs within a computer operating system to interact with a hardware device. A device driver typically communicates with the device through the computer bus or communications subsystem to which the hardware is connected. When a calling program invokes a routine in the device driver, the device driver issues commands to the device. Once the device sends data back to the device driver, the device driver may invoke routines in the original calling program.

A computer file is a block of arbitrary information, or resource for storing information, which is available to a computer program and is usually based on some kind of durable storage. A file is durable in the sense that it remains available for programs to use after the current program has finished.

Known computing operating systems usually track device and/or file opens that are performed by normal application programs and will ensure that the devices and files are closed when the application program exits. But this tracking by the operating systems does not completely protect against a device or file being left in an unwanted open/started state.

Some computer operating systems provide a mechanism for device drivers to open other device drivers. These are not normal application opens and are not tracked in the same way. The opens may need to persist beyond the exit of the application program that provoked the open. Also, known computer operating systems provide mechanisms to interact with devices beyond simple open( )/close( ). A device driver might provide a control entry point that allows a device to be readied for use, and a control exit point that allows the device to be quiesced after use. The computer operating system will provide a mechanism for calling the control entry points, but the operating system doesn't have any inherent knowledge of the fact that "QUIESCE" requests should be matched to "READY" requests like closes are matched to opens.

Because some opens, closes, and control requests are not tracked, difficulty occurs in determining why a device or file is being held in an opened or readied state when the device or file needs to be removed. A defect in an opener or readier could cause a device or file to become stuck in an open or ready state until the system is terminated.

SUMMARY

In one illustrative embodiment, a method, in a data processing system, is provided for automatically closing a file or a device. The illustrative embodiment monitors a request received from either an application that opened the file or a device driver that readied the device. The illustrative embodiment determines whether the file or the device has been accessed within a predetermined time interval. The illustrative embodiment sends a call to the application that opened the file or the application or a higher level device driver that requested that the device driver ready the device be readied to determine whether the application or higher level device driver still requires the file or the device in response to the file or the device failing to be accessed within the predetermined time interval. The illustrative embodiment closes the file or quiesces the device in response to a response from the application or the higher level device driver indicating that the use of the file or the device is no longer needed.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for automatically closing a file or a device in a data processing system. There is a general need within computer operating systems for devices and files to return to a closed or stopped state when the device or file is no longer needed by the process that opened the device or file. The illustrative embodiment enhances an intercomponent interface to monitor device requests and file requests so that devices and files will automatically return to a closed/quiesced/stopped state if the opening/readying/start neglects to periodically entertain the opened/readied/started device or file.

Figure 1:
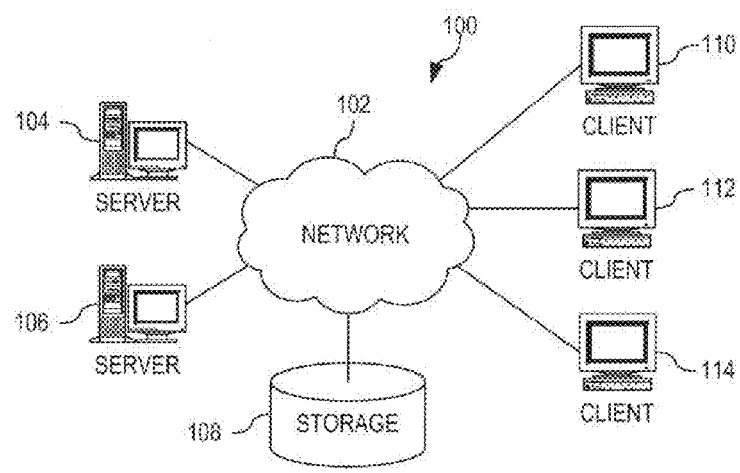
FIG. 1 depicts a pictorial representation of an example distributed data processing system in which aspects of the illustrative embodiments may be implemented.
Figure 2:
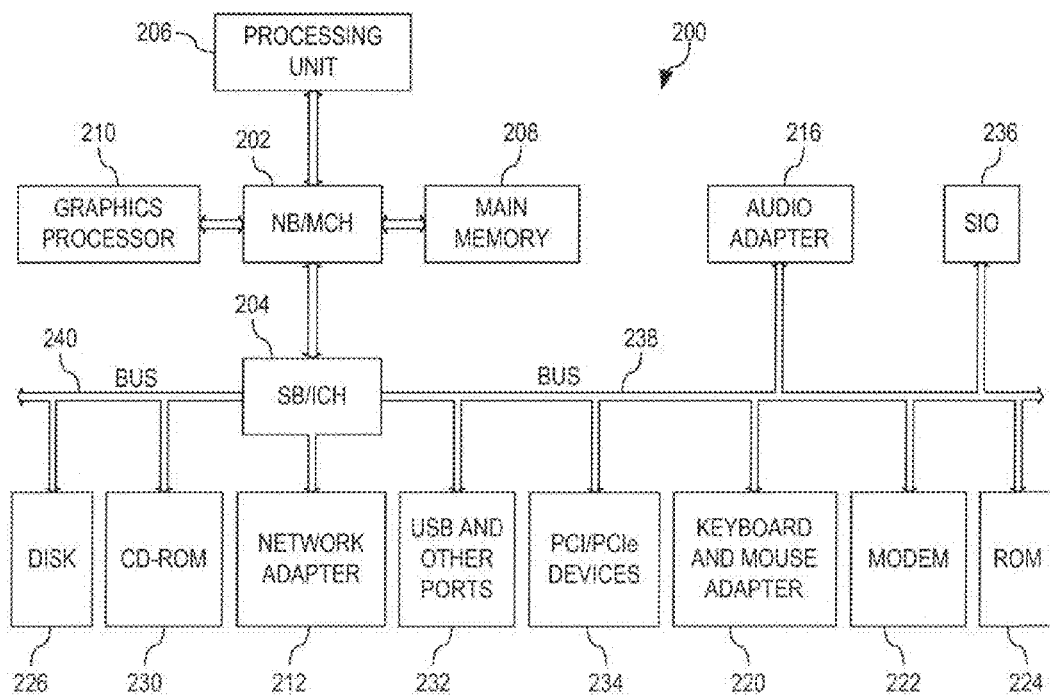
FIG. 2 shows a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation for automatically closing a file or a device in a data processing system, this is only an example and is not intended to state or imply any limitation with regard to the features of the present invention. To the contrary, the illustrative embodiments are intended to include distributed data processing environments and embodiments in which a file or a device in a data processing system may be automatically closed.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110. 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system. 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 maybe connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Components, such as applications or device drivers, interact using common operating system provided service routines for operations such as open, close, issue input/output (I/O), or the like. As a result, the service routines themselves have an accurate view of whether recent requests have been made. The illustrative embodiments provide for the opening, which may also be referred to as readying or starting, component to supply a callback function when making the opening service call. The common service routine then monitors request calls to determine whether the component that issued the opening service call still needs the requested device or file. For example, an AIX Fibre Channel (FC) protocol driver provides "START" and "STOP" ioctl( ) service requests that allow other components to ready the driver to communicate with a particular device on a storage area network (SAN). The FC driver may not be unloaded while any device is in a STARTed state. Requestors make the START or STOP request by calling an ioctl( ) function provided by the computer operating system. The operating system common ioctl( ) service routine then passes along the START or STOP request to the FC driver. The ioctl( ) service request could be enhanced to accept a callback function provided by the START requester. The common service routine may then call the callback function occasionally to confirm that the START requestor is still interested in the device. If the common service routine gets a negative response to the callback then the common service routine could notify the FC driver that the device was no longer needed by the requestor and the FC driver would be at liberty to STOP the device.

Figure 3:
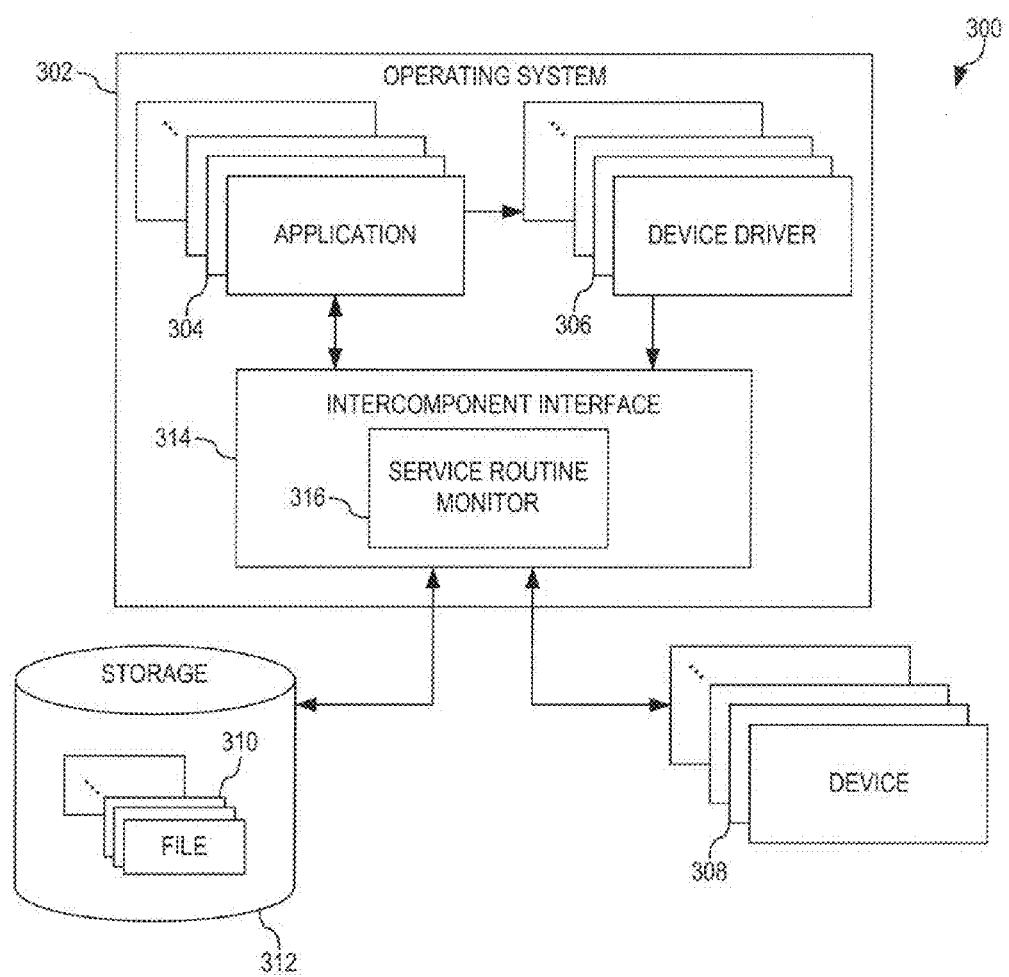
FIG. 3 depicts a block diagram of an automatic file and device closing mechanism in accordance with an illustrative embodiment.

FIG. 3 depicts a block diagram of an automatic file and device closing mechanism in accordance with an illustrative embodiment. Data processing system 300 comprises operating system 302 that executes applications 304 and device drivers 306. During execution, one or more of applications 304 may issue operations such as open, close, issue I/O, or the like. Thus, some of the operations issued by application 304 may be to load one of device drivers 306 in order to access devices 308 or may be to access one of files 310 in storage 312, or may be to request a higher level device driver (not shown) to load one of device drivers 306 in order to access devices 308. As such applications 304 and/or device drivers 306 interact using common operating system provided service routines for these operations. When applications 304 attempt to open one or more of files 310 or when device drivers 306 attempt to ready one or more of devices 308, then applications 304 and devices drivers 306 send requests through intercomponent interface 314 using a common service routine.

Service routine monitor 316 implements the automatic file and device closing mechanism of the illustrative embodiment. When service routine monitor 316 receives requests to open a file or ready a device, service routine monitor 316 determines whether a call back function has been included with each request. For each request that includes a call back function, service routine monitor 316 logs the request, the associated call back function, and starts a timer for the request. Then service routine monitor 316 starts to monitor the request for the file or the device. For each request, service routine monitor 316 determines whether the file or device has been accessed within a predetermined time interval. Each time a file is accessed by applications 304 or a driver is contacted through device drivers 306 associated with the request during the predetermined time interval, then service routine monitor 316 restarts the timer associated with the request and continues monitoring the request.

If the file is not accessed by applications 304 or the driver is not contacted through device drivers 306 associated with the request during the predetermined time interval, then service routine monitor 316 sends a call to the call back function in the requesting one of applications 304 that initiated the open to the file or the requesting one of applications 304 or a higher device driver that initiated the call to one of device drivers 306 to ready one or more of devices 308. However, prior to sending the call, service routine monitor 316 verifies that the requesting one of applications 304 is still running or the one of device drivers 306 is still loaded. Service routine monitor 316 performs this verification by querying an operating system process list for the application's process ID which is provided at open time of the application or by querying an operating system loader table for the presence of the device driver. Thus, service routine monitor 316 may identify that the requesting one of applications 304 is no longer running or the one of device drivers 306 is no longer loaded.

If the application is no longer running or the device driver is no longer loaded, then service routine monitor 316 closes or quiesces the file or driver. If however, service routine monitor 316 identifies that the application is running or the device driver is loaded, then service routine monitor 316 sends the call to the call back function in the requesting one of applications 304 that initiated the open to the file or the requesting one of applications 304 or a higher device driver that initiated the call to one of device drivers 306 to ready one or more of devices 308. If the response indicates that the file or device is still needed, then service routine monitor 316 restarts the timer associated with the request and continues monitoring the request. If the response indicates that the file or device is no longer needed, then service routine monitor 3 16 closes or quiesces the file or driver.

In addition to closing a file or quiescing a device using the timer associated with the request, an administrator may also force a file closed or a quiesce a file. That is, if service routine monitor receives a request from an administrator to close a file or quiesce a device, then service routine monitor issues a command to close the specified file or quiesces the specified driver. Further, the administrator may query the information being maintained by service routine monitor 316 to determine which files or devices are opened/readied/started, which callbacks functions are registered, times of most recent requests or affirmative callbacks, or the like, in order to identify files or devices that should be closed or quiesced.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In addition, the program code may be embodied on a computer readable storage medium on the server or the remote computer and downloaded over a network to a computer readable storage medium of the remote computer or the users' computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
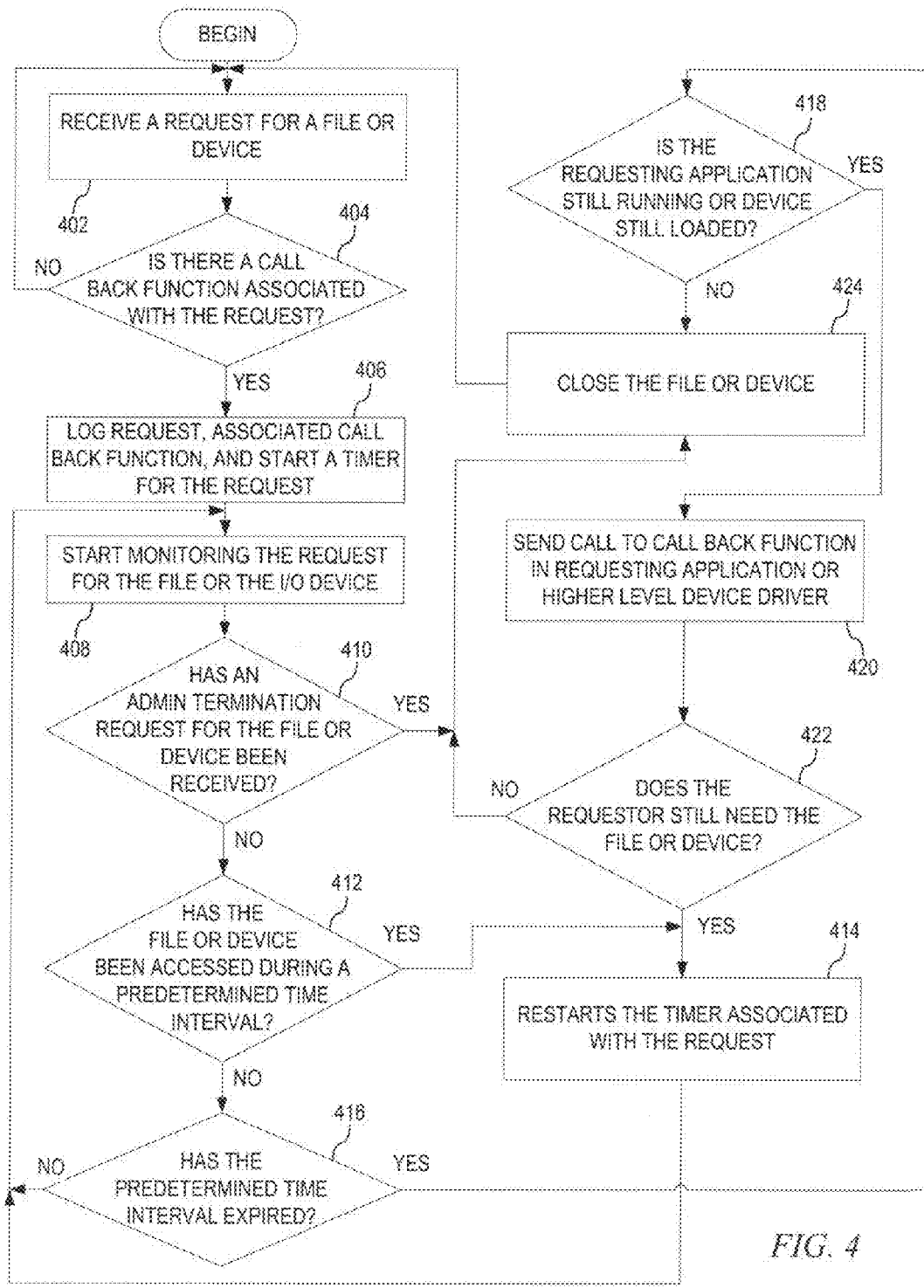
FIG. 4 depicts a flowchart outlining example operations of an automatic file and device closing mechanism in accordance with an illustrative embodiment.

Referring now to FIG. 4, this figure depicts a flowchart outlining example operations of an automatic file and device closing mechanism in accordance with an illustrative embodiment. As the operation begins, a service routine monitor receives a request to open a file or ready a device from an application or device driver on behalf of an application or a higher level device driver (step 402). The service routine monitor then determines whether a call back function has been included with the request (step 404). If at step 404 there is no associated call back function, then the service routine monitor passes the request onto the storage or device and the operation returns to step 402. For each request that includes a call back function, the service routine monitor logs the request, tie associated call back function, and starts a timer for the request (step 406). Then the service routine monitor starts to monitor the request for the file or the device (step 408).

For each request, the service routine monitor determines whether a request from an administrator has been received to close the file or quiesce the device associated with the request (step 410). If at step 410 no request has been received from an administrator, then the service routine monitor determines whether the file or device associated with the request has been accessed within a predetermined time interval (step 412). If at step 412 the file has been accessed, then the service routine monitor restarts the timer associated with the request (step 414) and continues monitoring the request in step 408.

If at step 412 the file is not accessed, then the service routine monitor determines whether the predetermined time intervals has expired (step 416). If at step 416 the predetermined time interval has not expired, then the service routine monitor continues monitoring the request in step 408. If the file is not accessed or the driver is not contacted through a device driver associated with the request during the predetermined time interval, then the service routine monitor determines whether the application is still running or the device driver is still loaded by querying an operating system process list for the application's process ID which is provided at open time of the application or by querying an operating system loader table for the presence of the device driver (step 418). If at step 418 the application is running or the device driver is loaded, then the service routine monitor sends a call to the call back function in the requesting application that initiated the open to the file or the requesting application or a higher device driver that initiated the call to one of device drivers to ready one or more of device (step 420).

The service routine monitor then determines whether the response indicates that the file or device is still required (step 422). If at step 422 the response indicates that the file or device is still needed, then the service routine monitor proceeds to step 414. If at step 422 the response indicates that the file or device is no longer needed or if at step 418 the application is no longer running or the device driver is no longer loaded or if at step 410 a request has been received from an administrator to close a specified file or quiesce a specified driver, then the service routine monitor closes or quiesces the file or driver (step 424) with the operation returning to step 402 thereafter.

Thus, the illustrative embodiments provide mechanisms for a mechanism for automatically closing a file or a device in a data processing system. There is a general need within computer operating systems for devices and files to return to a closed or stopped state when the device or file is no longer needed by the process that opened the device or file. The illustrative embodiment enhances an intercomponent interface to monitor device requests and file requests so that devices and files will automatically return to a closed/quiesced/stopped state if the opening/readying'start application or driver neglects to periodically entertain the opened/readied/started device or file.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the 'system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for automatically closing a file or a device, the method comprising:
    monitoring, by a service routine monitor in the data processing system, for a request received from either a first application that opened the file or a device driver that readied the device;
    determining, by the service routine monitor, whether the file or the device has been accessed within a predetermined time interval;
    responsive to the file or the device failing to be accessed within the predetermined time interval, sending, by the service routine monitor, a call to the first application that opened the file or a second application or a higher level device driver that requested that the device driver ready the device to determine whether the first application or higher level device driver still requires the file or the device; and
    responsive to a response from the first application or the higher level device driver indicating that the use of the file or the device is no longer needed, closing, by the service routine monitor, the file or quiescing, by the service routine monitor, the device.

2. The method of claim 1, further comprising:
    responsive to the response from the application or the higher level device driver indicating that the use of the file or the device is needed, restarting, by the service routine monitor, the time interval; and
    continue monitoring, by the service routine monitor, for the request received from either the application that opened the file or the device driver that readied the device.

3. The method of claim 1, further comprising:
    determining whether the application is still running or the device driver is still loaded;
    responsive to the application being no longer running or the device driver being no longer loaded, closing, by the service routine monitor, the file or quiescing, by the service routine monitor, the device.

4. The method of claim 3, wherein determining whether the application is still running or the device driver is still loaded further comprises:
querying at least one of an operating system process list for the presence of application's process ID which is provided at open time of the application or an operating system loader table for the presence of the device driver.

5. The method of claim 1, further comprising:
responsive to the file or the device being accessed within the predetermined time interval, restarting, by the service routine monitor, the time interval; and
continue monitoring, by the service routine monitor, for the request received from either the application that opened the file or the device driver that readied the device.

6. The method of claim 1, funher comprising:
receiving a request from an administrator to either close the file or quiesce the device; and
closing, by the service routine monitor, the file or quiescing, by the service routine monitor, the device responsive to receiving the request from the administrator.

7. The method of claim 6, wherein the file or the device is identified by the administrator querying information being maintained by the service routine monitor to determine at least one of which files or devices are opened or readied, determine which callback functions are registered, or times of most recent requests or affirmative callbacks.

8. A computer program product comprising a non-transitory computer readable storage medium having a computer readable program recorded thereon, wherein the computer readable program, when executed on a computer device, causes the computing device to:
monitor for a request received from either a first application that opened a file or a device driver that readied a device;
determine whether the file or the device has been accessed within a predetermined time interval;
responsive to the file or the device failing to be accessed within the predetermined time interval, send a call to the first application that opened the file or a second application or a higher level device driver that requested that the device driver ready the device to determine whether the first application or higher level device driver still requires the file or the device; and
responsive to a response from the first application or the higher level device driver indicating that the use of the file or the device is no longer needed, close the file or quiesce the device.

9. The computer program product of claim 8, wherein the computer readable program further causes the computing device to:
responsive to the response from the application or the higher level device driver indicating that the use of the file or the device is needed, restart the time interval; and
continue monitoring for the request received from either the application that opened the file or the device driver that readied the device.

10. The computer program product of claim 8, wherein the computer readable program further causes the computing device to:
determine whether the application is still running or the device driver is still loaded;
responsive to the application being no longer running or the device driver being no longer loaded, close the file or quiesce the device.

11. The computer program product of claim 10, wherein the computer readable program to determine whether the application is still running or the device driver is still loaded further comprises computer readable program that causes the computing device to:
query at least one of an operating system process list for the presence of application's process ID which is provided at open time of the application or an operating system loader table for the presence of the device driver.

12. The computer program product of claim 8, wherein the computer readable program further causes the computing device to:
responsive to the file or the device being accessed within the predetermined time interval, restart the time interval; and
continue monitoring for the request received from either the application that opened the file or the device driver that readied the device.

13. The computer program product of claim 8, wherein the computer readable program further causes the computing device to:
receive a request from an administrator to either close the file or quiesce the device; and
close the file or quiesce the device responsive to receiving the request from the administrator, wherein the file or the device is identified by the administrator querying information being maintained by the service routine monitor to determine at least one of which files or devices are opened or readied, determine which callback functions are registered, or times of most recent requests or affirmative callbacks.

14. The computer program product of claim 8, wherein the computer readable program is stored in a computer readable storage medium in a data processing system and wherein the computer readable program was downloaded over a network from a remote data processing system.

15. The computer program product of claim 8, wherein the computer readable program is stored in a computer readable storage medium in a server data processing system and wherein the computer readable program is downloaded over a network to a remote data processing system for use in a.computer readable storage medium with the remote system.

16. An apparatus, comprising:
a processor; and
a memory coupled to the processor, wherein the memory comprises instructions which, when executed by the processor, cause the processor to:
monitor for a request received from either a first application that opened a file or a device driver that readied a device;
determine whether the file or the device has been accessed within a predetermined time interval;
responsive to the file or the device failing to be accessed within the predetermined time interval, send a call to the first application that opened the file or a second application or a higher level device driver that requested that the device driver ready the device to determine whether the first application or higher level device driver still requires the file or the device; and
responsive to a response from the first application or the higher level device driver indicating that the use of the file or the device is no longer needed, close the file or quiesce the device.

17. The apparatus of claim 16, wherein the instructions further cause the processor to:
responsive to the response from the application or the higher level device driver indicating that the use of the file or the device is needed, restart the time interval; and
continue monitoring for the request received from either the application that opened the file or the device driver that readied the device.

18. The apparatus of claim 16, wherein the instructions further cause the processor to:
determine whether the application is still running or the device driver is still loaded;
responsive to the application being no longer running or the device driver being no longer loaded, close the file or quiesce the device, wherein the instructions to determine whether the application is still running or the device driver is still loaded further comprise instructions that causes the processor to:
query at least one of an operating system process list for the presence of application's process ID which is provided at open time of the application or an operating system loader table for the presence of the device driver.

19. The apparatus of claim 16, wherein the instructions further cause the processor to:
responsive to the file or the device being accessed within the predetermined time interval, restart the time interval; and
continue monitoring for the request received from either the application that opened the file or the device driver that readied the device.

20. The apparatus of claim 16, wherein the instructions further cause the processor to:
receive a request from an administrator to either close the file or quiesce the device; and
close the file or quiesce the device responsive to receiving the request from the administrator, wherein the file or the device is identified by the administrator querying information being maintained by the service routine monitor to determine at least one of which files or devices are opened or readied, determine which callback functions are registered, or times of most recent requests or affirmative callbacks.

* * * * *